(12) United States Patent  
Areskogh et al.

(10) Patent No.: US 11,104,774 B2
(45) Date of Patent: Aug. 31, 2021

(54) METHOD FOR INCREASING THE REACITIVITY OF LIGNIN, AND A RESIN COMPOSITION COMPRISING SAID LIGNIN

(71) Applicant: Stora Enso OYJ, Helsinki (FI)

(72) Inventors: Dimitri Areskogh, Stockholm (SE); Ashar Zafar, Alta (SE)

(73) Assignee: Stora Enso OYJ, Helsinki (FI)

(*) Notice: Subject to any disclaimer, the term of this patent is extended or adjusted under 35 U.S.C. 154(b) by 0 days.

(21) Appl. No.: 15/741,414

(22) PCT Filed: Jun. 29, 2016

(86) PCT No.: PCT/IB2016/053865
§ 371 (c)(1),
(2) Date: Jan. 2, 2018

(87) PCT Pub. No.: WO2017/006215
PCT Pub. Date: Jan. 12, 2017

(65) Prior Publication Data
US 2018/0371198 A1  Dec. 27, 2018

(30) Foreign Application Priority Data
Jul. 3, 2015  (SE) .................................. 1550956-5

(51) Int. Cl.
*C08J 7/12* (2006.01)
*C08G 8/24* (2006.01)
(Continued)

(52) U.S. Cl.
CPC ............... *C08J 7/12* (2013.01); *B27N 3/002* (2013.01); *C08G 8/24* (2013.01); *C08G 8/38* (2013.01);
(Continued)

(58) Field of Classification Search
CPC ........................................................ C08J 7/12
See application file for complete search history.

(56) References Cited

U.S. PATENT DOCUMENTS 2,449,209 A  9/1948  Farber et al.
3,864,291 A  2/1975  Enkvist
(Continued)

FOREIGN PATENT DOCUMENTS

CN  104245799 A  12/2014
DE  2334540 A  1/1974
(Continued)

OTHER PUBLICATIONS

Hu, L. et al. "Methods to improve lignin's reactivity as a phenol substitute and as a replacement for other phenolic compounds: A brief overview" In: BioResources, 2011, vol. 6, No. 3, pp. 3515-3525; pp. 7-8; Chapter "Hydrolysis".
(Continued)

*Primary Examiner* — Arrie L Reuther
(74) *Attorney, Agent, or Firm* — Greer, Burns & Crain, Ltd.

(57) ABSTRACT

The present invention relates to a method for increasing the reactivity of lignin which method comprises the following steps; providing a mixture comprising lignin and an alkali solution wherein the concentration of the alkali solution of the mixture is between 5-50% by weight, storing said mixture for a period of at least 1 day whereby the reactivity of the lignin is increased. The present invention also relates to a resin composition comprising said lignin and use of said resin composition.

9 Claims, 4 Drawing Sheets

Figure 1:
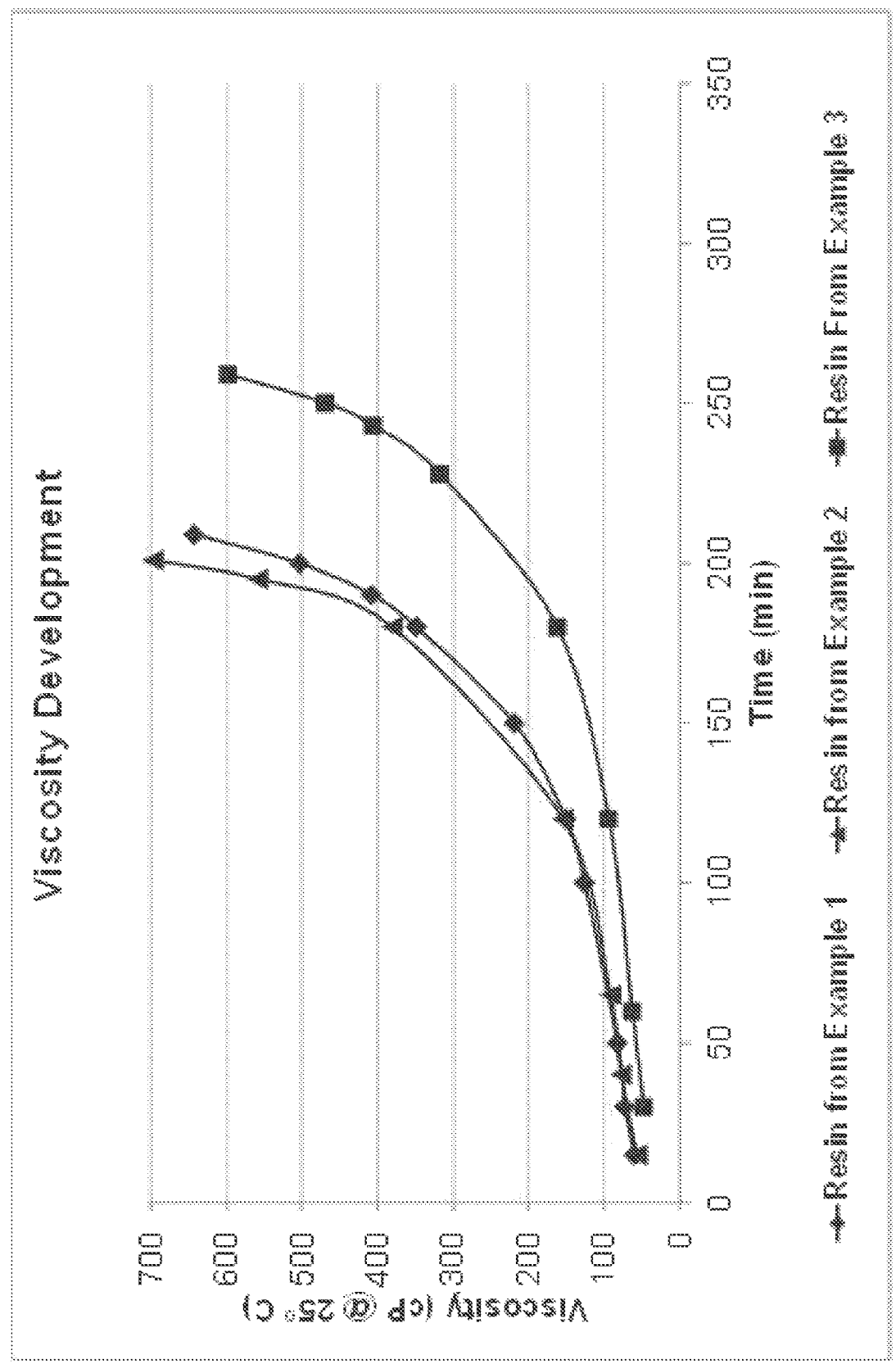

(51) Int. Cl.
*C08L 97/00* (2006.01)
*C08G 8/38* (2006.01)
*C09J 161/12* (2006.01)
*B27N 3/00* (2006.01)
*C09J 197/00* (2006.01)
*C08K 3/22* (2006.01)
*C08L 61/12* (2006.01)

(52) U.S. Cl.
CPC .............. *C08K 3/22* (2013.01); *C08L 97/005* (2013.01); *C09J 161/12* (2013.01); *C09J 197/005* (2013.01); *C08J 2397/00* (2013.01); *C08K 2003/2206* (2013.01); *C08K 2003/2224* (2013.01); *C08L 61/12* (2013.01)

(56) References Cited

U.S. PATENT DOCUMENTS 4,306,999 A * 12/1981 Adams ..................... C08G 8/28
524/735

2002/0065400 A1 5/2002 Raskin et al.
2011/0245381 A1 10/2011 Winterowd et al.
2014/0249271 A1* 9/2014 Pietarinen ................ C08H 6/00
524/799

FOREIGN PATENT DOCUMENTS

| | | |
|---|---|---|
| EP | 1288237 A2 | 3/2003 |
| WO | 9321260 | 10/1993 |
| WO | 2010127422 A1 | 11/2010 |
| WO | 2013144453 A1 | 10/2013 |
| WO | 2013144454 A1 | 10/2013 |
| WO | 2015044528 | 4/2015 |

OTHER PUBLICATIONS

International Search Report for PCT/IB2016/053865, dated Sep. 29, 2016.

* cited by examiner

METHOD FOR INCREASING THE REACTIVITY OF LIGNIN, AND A RESIN COMPOSITION COMPRISING SAID LIGNIN

This application is a U.S. National Stage under 35 U.S.C. § 371 of International Application No. PCT/IB2016/053865, filed Jun. 29, 2016, which claims priority to Swedish Patent Application No. 1550956-5, filed Jul. 3, 2015.

FIELD OF INVENTION

The present invention relates to a method for increasing the reactivity of lignin, a resin composition comprising said lignin and use of said resin composition.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strand board and fiberboard. During synthesis of such adhesives, lignin, partially replaced by phenol, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

WO2013144454 describes a method to increase the reactivity of lignin by using heat and alkali.

However, there is still a need for an efficient method to increase the reactivity of lignin in order to improve its' performance e.g. as a phenol substitute in phenol-formaldehyde resins.

SUMMARY OF INVENTION

The object of the invention is to provide a method for increasing the reactivity of lignin in an easy and efficient way.

Another object of the present invention is to provide a resin composition with lignin having increased activity.

The present invention relates to a method for increasing the reactivity of lignin which method comprises the following steps; providing a mixture comprising lignin and an alkali solution wherein the concentration of the alkali solution of the mixture is between 5-50% by weight, storing said mixture for a period of at least 1 day whereby the reactivity of the lignin is increased.

Surprisingly and unexpectedly, it was found that storage of lignin in an alkali solution with relative high concentration increases the reactivity of the lignin. By increasing the reactivity is meant that the rate of reaction when the lignin is used in the synthesis of lignin-phenol-formaldehyde resin is increased. The reason why the lignin has improved reactivity is not fully understood and it was very surprising since the reactivity according to U.S. Pat. No. 4,306,999 is expected to be stable and should not increase.

The lignin is preferably stored for a period of 1 day-24 weeks, more preferably between 1 day-12 weeks, more preferably between 1 day-4 weeks and most preferably between 1-7 days.

The storage is preferably done at room temperature, i.e. at a temperature of 20-30° C. Since it was not necessary to increase the temperature of the lignin in order to increase the reactivity, the process is very cost efficient.

The lignin is preferably dissolved in the alkali solution, i.e. the mixture comprises dissolved lignin and alkali solution.

The mixture preferably comprises 10-80% by weight of lignin, preferably between 20-60% by lignin, even more preferably between 25-50% by weight of lignin. The concentration of the alkali solution is preferably between 5-30% by weight, preferably between 10-30% by weight or even more preferably between 10-20% by weight before the lignin is added to form said mixture.

The alkali is preferably sodium hydroxide, potassium hydroxide, calcium hydroxide and/or magnesium hydroxide.

The method preferably comprises the step of separating the lignin from the mixture after storage. The lignin may be separated from the mixture after storage in any known way. One example is to separate the lignin by lowering the pH of the mixture by adding an acid. The dissolved lignin is then precipitated and can be separated for example by filtration. The separated lignin may then be washed and dried and further treated to form a powder. The lignin powder having increased reactivity may then be used for example in a resin composition, preferably a lignin-phenol-formaldehyde resin The present invention also relates to a resin composition comprising lignin treated according to the method described above.

There are a number of advantages of utilizing this activated lignin such as:
1. The activated lignin can either be in a precipitated dry state as a precipitated powder or as a liquefied composition where it is dissolved.
2. No additional activation steps such as prolonged and/or stepwise heating are necessary prior to resin synthesis
3. The activated lignin, when provided in a liquidified shape, can be easily pumped and dosed during resin synthesis.
4. Furthermore, the same catalyst that is present in the liquefied lignin composition is also used during resin synthesis.
5. The activated lignin, when provided in a precipitated and dry state, can be easily shipped with minimal water content which adds to the final shipping cost.

The resin composition is preferably a lignin-phenol-formaldehyde resin.

The present invention also relates to the use of the resin composition in engineered wood products such as plywood, particle board, wafer board, gluelam beams, structural composite lumber, oriented strand board (OSB), oriented strand lumber (OSL) and other applications such as laminates, insulation and molding compounds.

It has been found that storing lignin in alkali at relative high alkali charges for a prolonged time has significantly beneficial effects of the viscosity development during resin synthesis which effectively reduces the synthesis time while improving the final resin properties with reduced gel times.

DETAILED DESCRIPTION OF THE INVENTION

It is intended throughout the present description that the expression "lignin" embraces any kind of lignin, e.g. lignin originated from hardwood, softwood or annular plants. Preferably the lignin is an alkaline lignin generated in e.g. the Kraft process. The lignin may then be separated from the black liquor by using the process disclosed in WO2006031175.

With storage is meant that the mixture is stored with or without stirring or mixing for a certain period of time. The storage is preferably done in closed containers so that the water is not evaporated off during storage.

The storage is preferably done at room temperature which is the most cost efficient way and it was surprising that storage at room temperature was sufficient in order to improve the reactivity since it has previously been shown that treatment of lignin at increased temperatures is needed to increase the reactivity of the lignin. However, it might also be possible to increase the temperature of the lignin and/or mixture before, during or after storage in order even further increase the reactivity of the lignin.

FIGURES

FIG. 1: Shows the viscosity change of mixtures of lignin, phenol, formaldehyde, water and alkali catalyst during heating described in Examples A FIG. 2: Shows the viscosity change of mixtures of lignin, phenol, formaldehyde, water and alkali catalyst during heating described in Examples B.

Figure 3:
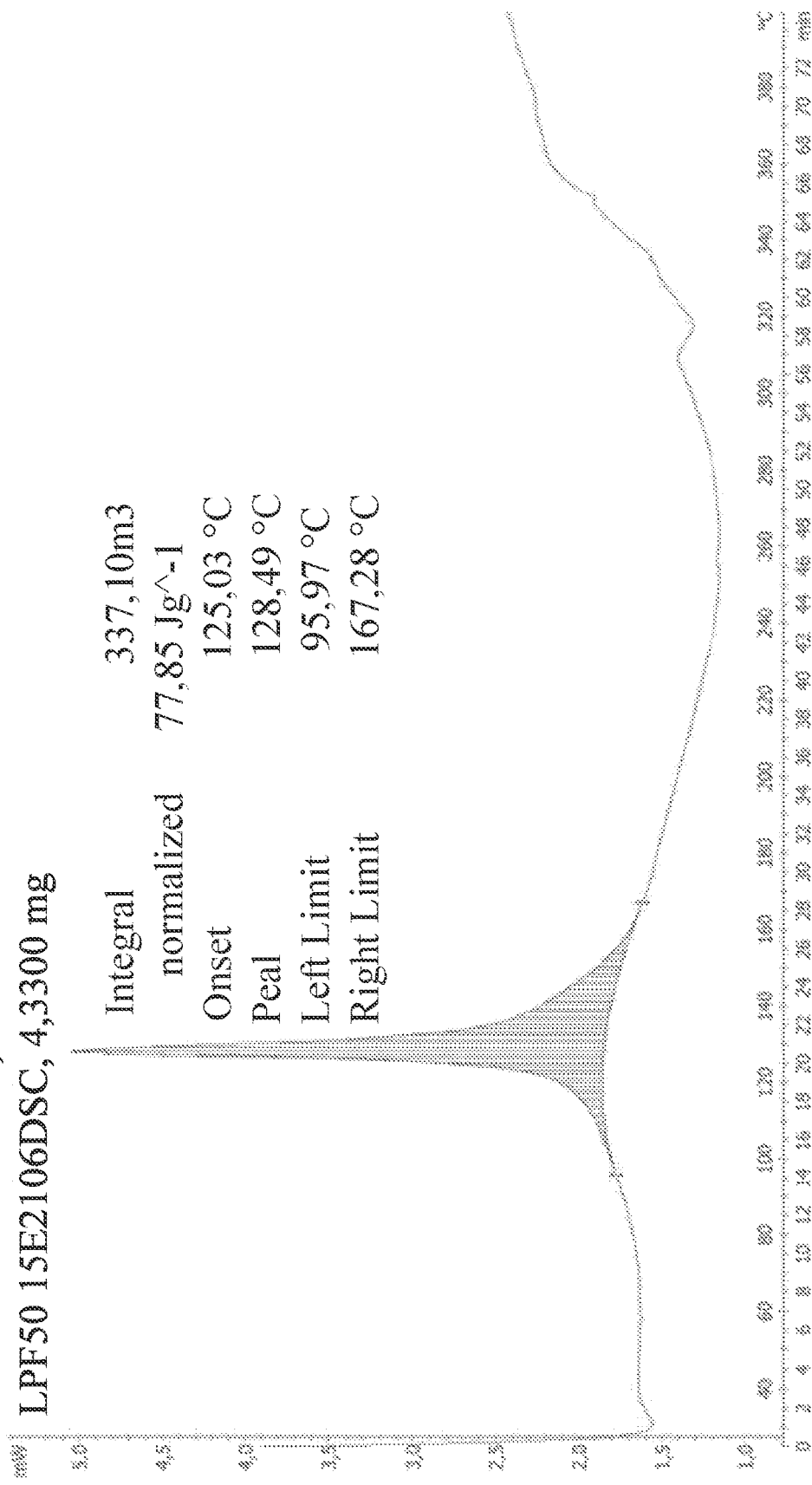

FIG. 3: Shows DSC scan of Resin from Example 7.

Figure 4:
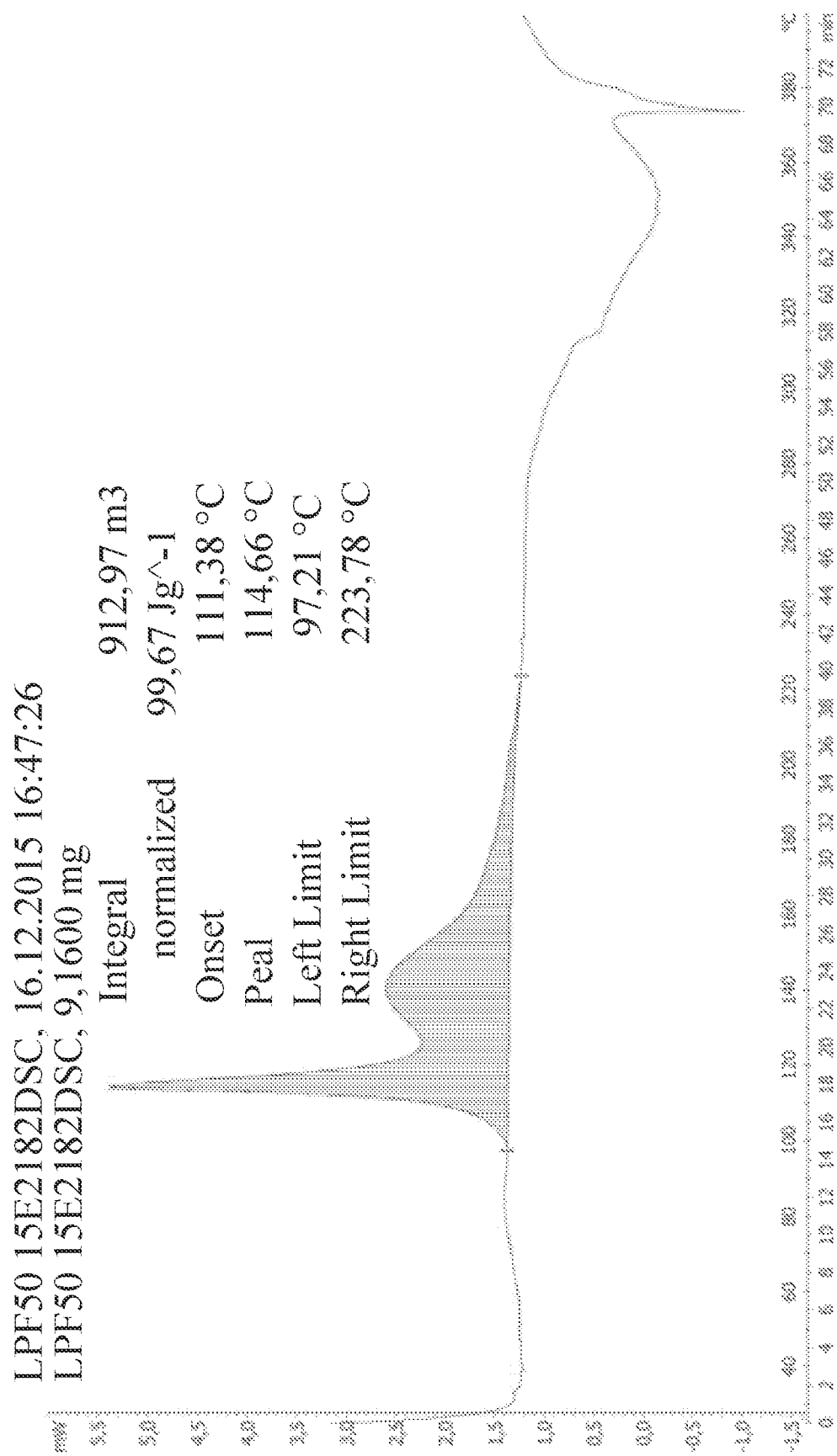

FIG. 4: Shows DSC scan of Resin from Example 8.

EXAMPLES

Example A

In Example A three different resins samples were prepared and compared. The resins were prepared as described below in Example 1, Example 2 and Example 3. Example 1 describes a resin comprising a lignin stored in alkali for 4 weeks, Example 2 describes a resin comprising a lignin stored in alkali for 8 weeks and Example 3 describes a resin comprising a lignin that has not been stored in alkali as a reference.

Example 1—Activation of Dry Lignin 4 Weeks

Kraft lignin was dissolved at a concentration of 25% (w/w) in 10% NaOH solution and the mixture was stored for 4 weeks at room temperature (20-23° C.).

After storage, lignin was precipitated by lowering the pH. The precipitated lignin was then separated, washed and dried as a powder. Finally, the powder was used as a partial substitute of phenol during synthesis of a phenol-formaldehyde resin. Lignin, phenol, formaldehyde, water and alkali catalyst were mixed. A phenol substitution degree by lignin of 50% was used (by weight) together with a phenol-formaldehyde ratio of 1.8 (by weight). Alkali was added as a 45% solution (by weight) at alkali-to-phenol ratio of 0.5 (by weight). Additional water was added to reach a final solid content of 47-48% (by dry weight). The mixture was then heated to 80° C. until a final viscosity of ~500 cP was achieved. Viscosity was measured by using a Brookfield DV-II+LV viscometer which was kept at 25° C. by using a recirculation water bath. Samples were withdrawn from the reaction vessel, cooled and the viscosity was obtained.

Example 2—Activation of Dry Lignin 8 Weeks

Kraft lignin was dissolved at a concentration of 25% (w/w) in 10% NaOH solution and the mixture was stored for 8 weeks at room temperature (20-23° C.).

After storage, lignin was precipitated by lowering the pH. The precipitated lignin was then separated, washed and dried as a powder. Finally, the powder was used as a partial substitute of phenol during synthesis of a phenol-formaldehyde resin as described in Example 1.

Example 3—Comparative Example

Kraft lignin powder from lignin that has not been subjected to alkali storage was used as a partial substitute of phenol during synthesis of a phenol-formaldehyde resin. Lignin, phenol, formaldehyde, water and alkali catalyst were mixed. A phenol substitution degree by lignin of 50% was used (by weight) together with a phenol-formaldehyde ratio of 1.8 (by weight). Alkali was added as a 45% solution (by weight) at alkali-to-phenol ratio of 0.5 (by weight). Additional water was added to reach a final solid content of 47-48% (by dry weight). The mixture was then heated to 80° C. until a final viscosity of ~500 cP was achieved.

The viscosity of the resins described in Examples 1-3 are shown in FIG. 1. The improved reactivity of resins comprising the stored lignin was observed as the viscosity increase was substantially faster compared to the resin comprising the lignin which was not subjected to storage in alkali.

Example B

In Example B two different resins samples were prepared and compared. The resins were prepared as described below in Example 4 and Example 5. Example 4 describes a resin comprising a lignin stored in alkali for 1 week and Example 5 describes a resin comprising a lignin that has not been stored in alkali as a reference.

Example 4—Activation of Lignin in Alkali 1 Week

Lignin-phenol-formaldehyde resin was synthesized in two steps. In the first step, lignin dispersion was prepared by mixing of 42.6 g of lignin (96% lignin), 37.4 g of water and 23 g of 45% sodium hydroxide solution for 90 minutes in a glass reactor equipped with condenser, overhead stirrer and thermometer. The lignin dispersion was stored for 1 week at room temperature.

In the 2nd step, the stored lignin, 40 g of phenol and 110 g of 37% formaldehyde solution were added to the glass reactor and mixed. The pH of the solution was adjusted to 11.5 with the addition of an aqueous solution of 45% sodium hydroxide. The reaction mixture was cooked at 80° C. until the viscosity of the reaction mixture reached a certain viscosity. The viscosity was measured at 25° C. using a Brookfield DV-II+LV viscometer. After the reaction mixture reached the certain viscosity, it was cooled rapidly to room temperature using a cold water bath.

Example 5: Comparative Example Ratio

Lignin-phenol-formaldehyde resin was synthesized with a degree of substitution of the phenol with lignin equal to about 50% by weight. In the first step, lignin dispersion was prepared by mixing of 42.6 g of lignin (96% lignin), 40 g of phenol, 37.4 g of water and 110 g of 37% formaldehyde solution for 90 minutes in a glass reactor equipped with condenser, overhead stirrer and thermometer. In the 2nd step, the pH of the solution was adjusted to 11.5 with the step-wise addition of an aqueous solution of 45% sodium hydroxide (42 g). The reaction mixture was cooked at 80° C.

until the viscosity of the reaction mixture reached a certain viscosity. The viscosity was measured at 25° C. using a Brookfield DV-II+LV viscometer. After the reaction mixture reached the certain viscosity, it was cooled rapidly to room temperature using a cold water bath.

Figure 2:
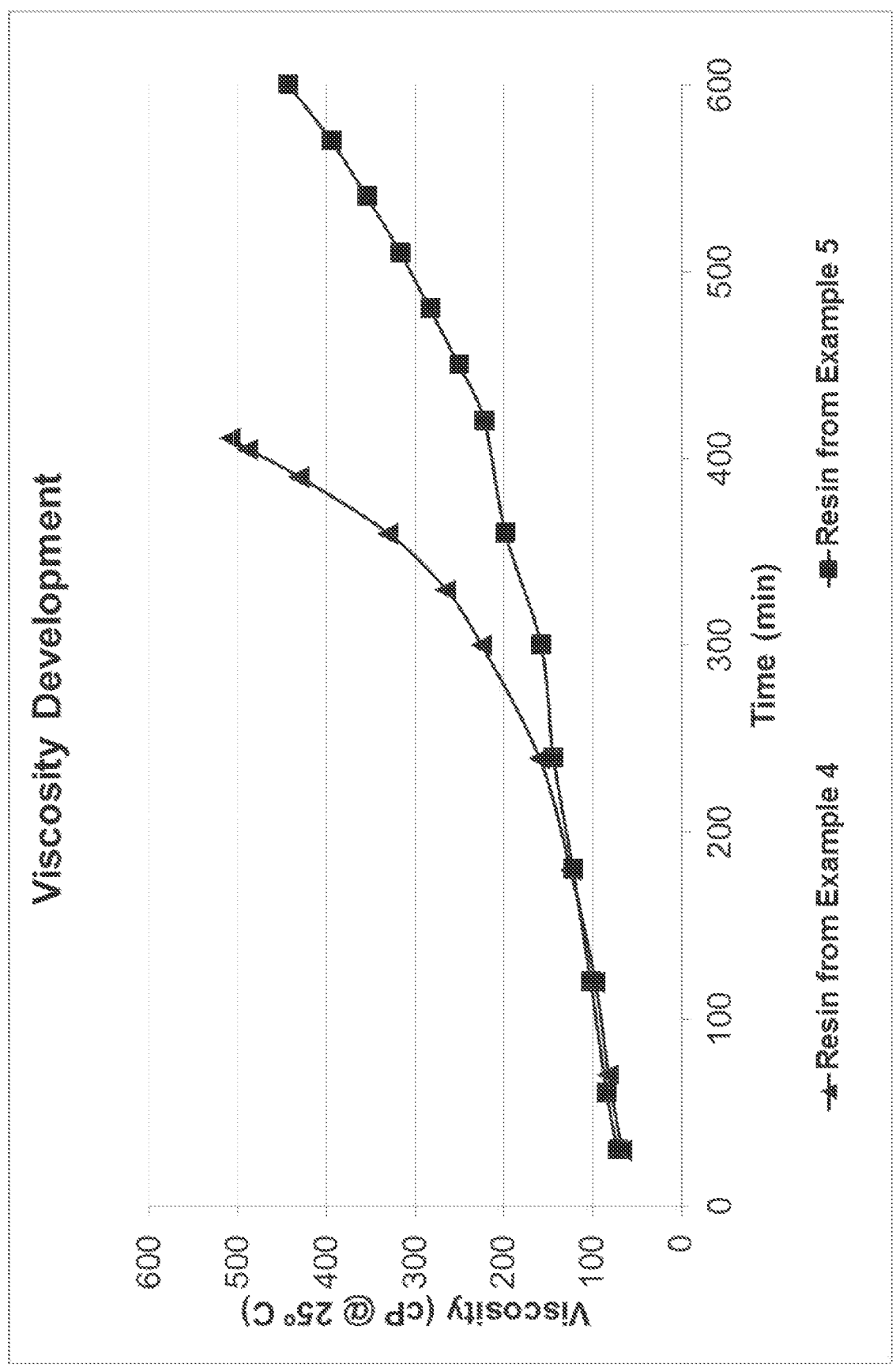

Results from Example B are shown in FIG. 2. The improved reactivity of the resin comprising stored lignin was observed as the viscosity increase was substantially faster compared to the resin comprising the lignin which was not subjected to storage in alkali.

Example C

In this example the gel time of resins comprising lignin that have been stored at different alkali charges and for different times were investigated. The gel time of the final resins in each example were investigated by mean of gel time analysis according to ISO 9396.

The gel times for the resins described in Examples 5-8 were compared. Example 5 describes a resin comprising a lignin that was not stored in alkali (see preparation of the resin above), Example 6 describes a resin comprising lignin stored at a high alkali concentration for 1 week, Example 7 describes a resin comprising lignin stored at a low alkali concentration for 1 week and Example 8 describes a resin comprising lignin stored at a high alkali concentration for 1 day.

Example 6—High Alkali Storage 1 Week

Lignin-phenol-formaldehyde resin, with a degree of substitution of the phenol with lignin equal to about 50% by weight, for preparing plywood panel was cooked in a 5 L glass reactor.

In the first step, lignin dispersion was prepared by mixing of 463 g of lignin (95% lignin), 411 g of water and 253 g of 45% sodium hydroxide solution for 90 minutes in the glass reactor, giving a final alkali concentration of 10% w/w. After mixing for 90 minutes, the lignin dispersion was stored for 1 week at room temperature.

After storage, the lignin dispersion, 444 g of phenol and 1210 g of 37% formaldehyde solution were added to the glass reactor. The temperature of the reaction mixture was increased to 60° C. and kept constant for 30 minutes. Then, the temperature was increased to 80° C. and the viscosity was measured at 25° C. using a Brookfield viscometer. The temperature of the reaction mixture was maintained at 80° C. until it reached a viscosity of 350-450 cP.

At this stage, an additional amount of 187 g of 45% sodium hydroxide solution was added to the mixture giving the pH of 11.3-11.5 and the reaction temperature was lowered to 75° C. When the desired viscosity (400-450 cP) was achieved, the reaction was cooled down to room temperature (20° C.).

Example 7: Low-Alkali Storage for 1 Week

Lignin-phenol-formaldehyde resin, with a degree of substitution of the phenol with lignin equal to about 50% by weight, for preparing plywood panel was cooked in a 5 L glass reactor.

In the first step, lignin dispersion was prepared by mixing of 463 g of lignin (95% lignin), 411 g of water and 98 g of 45% sodium hydroxide solution for 90 minutes in the glass reactor giving a final alkali concentration of 4% w/w. After mixing for 90 minutes, the lignin dispersion was stored for one week at room temperature.

After storage, the lignin dispersion, 155 g 45% alkali solution, 444 g of phenol and 1210 g of 37% formaldehyde solution were added to the glass reactor. The temperature of the reaction mixture was increased to 60° C. and kept constant for 30 minutes. Then, the temperature was increased to 80° C. and the viscosity was measured at 25° C. using a Brookfield viscometer. The temperature of the reaction mixture was maintained at 80° C. until it reached a viscosity of 350-450 cP.

At this stage, an additional amount of 187 g of 45% sodium hydroxide solution was added to the mixture giving the pH of 11.3-11.5 and the reaction temperature was lowered to 75° C. When the desired viscosity (400-450 cP) was achieved, the reaction was cooled down to room temperature (20° C.).

Example 8: High Alkali Storage for 1 Day

Lignin-phenol-formaldehyde resin, with a degree of substitution of the phenol with lignin equal to about 50% by weight, for preparing plywood panel was cooked in a 5 L glass reactor.

In the first step, lignin dispersion was prepared by mixing of 463 g of lignin (95% lignin), 411 g of water and 253 g of 45% sodium hydroxide solution for 90 minutes in the glass reactor giving a final alkali concentration of 10% w/w. After mixing for 90 minutes, the lignin dispersion was stored for one day at room temperature.

After storage, the lignin dispersion, 444 g of phenol and 1210 g of 37% formaldehyde solution were added to the glass reactor. The temperature of the reaction mixture was increased to 60° C. and kept constant for 30 minutes. Then, the temperature was increased to 80° C. and the viscosity was measured at 25° C. using a Brookfield viscometer. The temperature of the reaction mixture was maintained at 80° C. until it reached a viscosity of 350-450 cP. At this stage, and additional amount of 187 g of 45% sodium hydroxide solution was added to the mixture giving the pH of 11.3-11.5 and the reaction temperature was lowered to 75° C. When the desired viscosity (400-450 cP) was achieved, the reaction was cooled down to room temperature (20° C.).

The results of the gel time for the different resins investigated in Example C are shown in Table 1.

TABLE 1

| Gel time of resin from Examples 5-8 | |
| --- | --- |
| Samples | Gel time (min) |
| Resin from Example 5 | 67 |
| Resin from Example 6 | 27 |
| Resin from Example 7 | 65 |
| Resin from Example 8 | 26 |

As can be seen in Table 1, storage of lignin in low-alkali conditions is detrimental to the reduction of gel time for the resins while the positive effects of gel time for the resins comprising lignin stored in high-alkali conditions can be seen already after 1 day of storage.

Example D

In this Example a thermal analysis of the resins were investigated. Differential scanning calorimetry (DSC) for two different resins described in Example 9 and Example 10 were done.

Example 9 describes a resin comprising lignin that was stored for two weeks at high alkali concentrations and Example 10 describes a resin comprising lignin that was not stored as a reference sample.

Example 9: Synthesis of Resin for Plywood Production

Lignin-phenol-formaldehyde resin, with a degree of substitution of the phenol with lignin equal to about 50% by weight, for preparing plywood panel was cooked in a 5 L glass reactor.

In the first step, lignin dispersion was prepared by mixing of 463 g of lignin (95% lignin), 411 g of water and 253 g of 45% sodium hydroxide solution for 90 minutes in a glass reactor equipped with condenser, overhead stirrer and thermometer. After mixing for 90 minutes, the lignin dispersion was stored for two weeks at room temperature.

After storage, the lignin dispersion, 444 g of phenol and 1210 g of 37% formaldehyde solution were added to the glass reactor. The temperature of the reaction mixture was increased to 60° C. and kept constant for 30 minutes. Then, the temperature was increased to 80° C. and the viscosity was measured at 25° C. using a Hoppler viscometer. The temperature of the reaction mixture was maintained at 80° C. until it reached a viscosity of 350-450 cP. At this stage, an additional amount of 187 g of 45% sodium hydroxide solution was added to the mixture giving the pH of 11.3-11.5 and the reaction temperature was lowered to 75° C. When the desired viscosity (400-450 cP) was achieved, the reaction was cooled down to room temperature (20° C.). The resin was thereafter used for plywood manufacturing and testing.

Example 10: Synthesis of Resin for Plywood Production—Comparative Example

Lignin-phenol-formaldehyde resin for preparing plywood panel was cooked in a 5 L glass reactor.

Firstly, 463 g of lignin (95% lignin), 444 g of phenol, 411 g of water and 1210 g of 37% formaldehyde solution were added to the glass reactor equipped with condenser, overhead stirrer and thermometer.

Secondly, 253 g of NaOH solution (45%) was added slowly to prevent excessive heat development and giving a pH of 10.2-10.5. The temperature was kept constant at 60° C. for 30 minutes and was then increased to 80° C. The viscosity was measured at 25° C. using a Hoppler viscometer. The temperature of the reaction mixture was maintained at 80° C. until it reached a viscosity of 400-450 cP.

At this stage, more 187 g of sodium hydroxide solution was added to the mixture giving the pH of 11.3-11.5 and the reaction temperature was lowered to 75° C. When the desired viscosity (400-450 cP) was achieved, the reaction was cooled down to room temperature (20° C.).

The final resin was investigated by DSC. The resin was used for plywood manufacturing and testing.

The DSC scan of the resins described in Example 9 is shown in FIG. 3 and the DSC scan of the resin described in Example 10 is shown in FIG. 4. As can be seen in the DSC analysis, the resin in Example 9 displayed a thermogram with only one distinguishable exothermic signal (at 128° C.) while the resin from the Comparable Example 10 produced two peaks (111° C. and 140° C.). Presence of additional signals in the exothermic peak is a clear indication of a non-uniform curing behavior where interfering side-reactions are occurring.

Furthermore, the gel time of the resins in Example 9 and Example 10 were investigated by mean of gel time analysis according to ISO 9396. The results can be found in Table 2.

TABLE 2

Gel time of resin from Examples 9-10

| Samples | Gel time (min) |
|---|---|
| Resin from Example 9 | 28 |
| Resin from Example 10 | 57 |

Combining the results from the DSC with the clearly observed reduction in gel time in Table 2 it is thus evident that the lignin composition used in Example 9 has been activated as the final resin displays had a significant faster rate of curing.

Example E

In this example Plywood was produced with the resins described in Example 9 and Example 10 as described above.

Example 11: Plywood Production

Veneers were sawn to 550×550 mm$^2$ size and conditioned in 20° C., 65% RH prior to manufacture. Glues comprising resin from Examples 9 and 10 were formulated according to Table 3.

TABLE 3

Composition of glue for Plywood board

| Component | Amount [%] |
|---|---|
| Resin from Example 9 and Example 10 | 77.5 |
| Water | 8 |
| Olive seed flour | 10.7 |
| NaOH (35%) | 3.8 |

Target glue content was 180 g glue/m$^2$ which was spread on one side. Hot pressing was performed at 140° C. with a pressure of 1 MPa, with repeated release of steam during the first 4 minutes. The total pressing time was 10 minutes. After hot-pressing, the boards were cooled between two aluminum plates at room temperature.

Prior to evaluation all samples were conditioned according to EN636 class 3 test method. Shear strength was evaluated according to EN314 test method. Average data from 3 boards is presented in Table 4.

TABLE 4

Plywood board shear strength

| Board resin | Shear Strength (MPa) Average |
|---|---|
| Ex. 9 | 1.52 |
| Ex. 10 | 1.38 |

From Table 4 it is evident that the plywood board based on the resin where the lignin composition has been subjected to storage displays similar and even somewhat improved physical characteristics as compared to the reference resin where the lignin was not subjected to storage.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for increasing the reactivity of lignin which method comprises the following steps:
   providing a mixture consisting of lignin and an alkali solution wherein the concentration of the alkali of the mixture is between 10-50% by weight,
   storing said mixture for a period of at least 1 day whereby the reactivity of the lignin is increased, wherein the storage is done at room temperature that is between 20-30° C.

2. The method according to claim 1 wherein the lignin is stored for a period of 1 day 12 weeks.

3. The method according to claim 1 wherein the lignin is dissolved in the alkali solution.

4. The method according to claim 1 wherein the mixture comprises 10-80% by weight of lignin.

5. The method according to claim 1 wherein the alkali comprises at least one of sodium hydroxide, potassium hydroxide, calcium hydroxide and magnesium hydroxide.

6. The method according to claim 1 wherein the method comprises the step of separating the lignin from the mixture after storage.

7. A resin composition comprising lignin treated according to the method according to claim 1.

8. The resin composition according to claim 7 wherein the resin is a lignin-phenol-formaldehyde resin.

9. The method according to claim 1 wherein the mixture comprises 25-50% by weight of lignin.

* * * * *